E. C. MARTIN.
Ditching Plow.
No. 547, 31,551.
Patented Feb. 26, 1861.
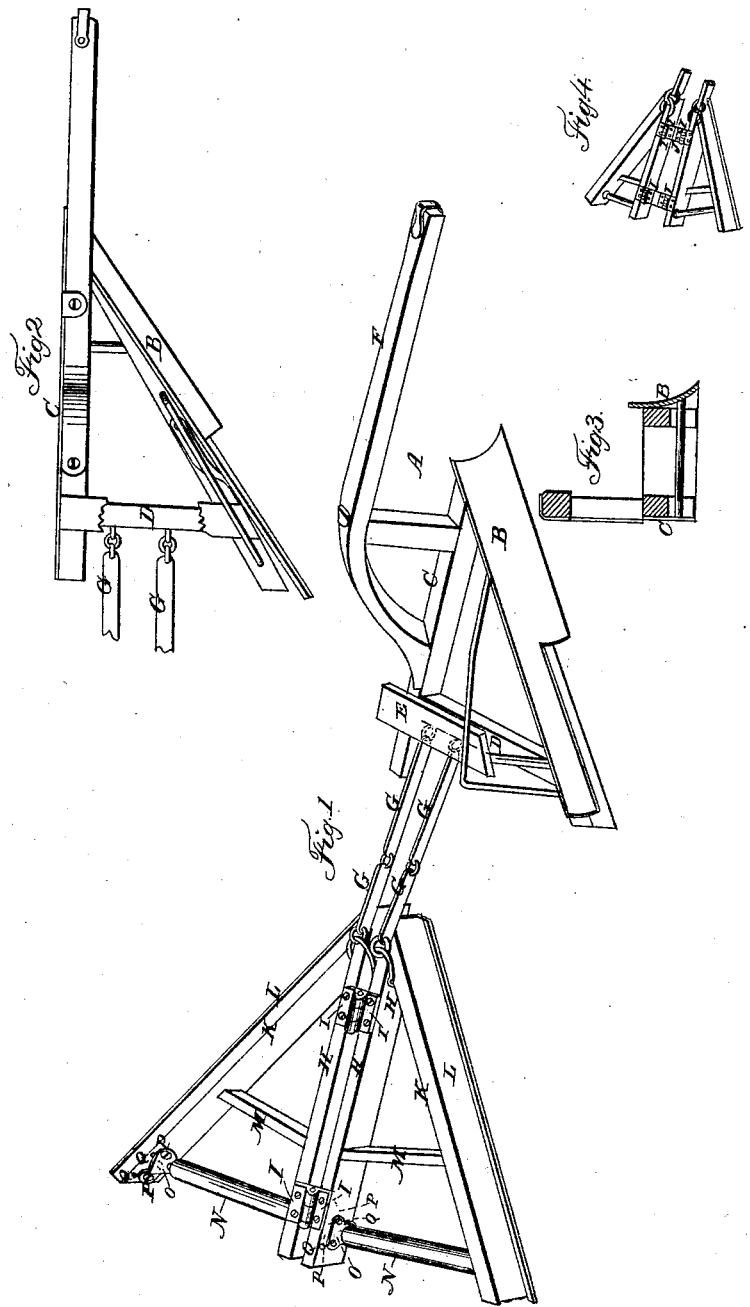
Witnesses.
Goodwin By AsLee
R W Fenwick
Inventor
E C Martin
by Munn & Co
Attorney

UNITED STATES PATENT OFFICE.

E. C. MARTIN, OF MUSCATINE, IOWA.

IMPROVED DITCHING-MACHINE.

Specification forming part of Letters Patent No. 31,551, dated February 26, 1861.

*To all whom it may concern:*

Be it known that I, E. C. MARTIN, of Muscatine, in the county of Muscatine and State of Iowa, have invented a new and useful Improvement in Ditching-Machines; and I do hereby declare that the following is a full, clear, and exact description of the same, reference being had to the accompanying drawings, forming a part of this specification, in which—

Figure 1 represents my ditching apparatus when used for narrow ditches. Fig. 2 is a plan, and Fig. 3 a vertical section, of the ditching-plow. Fig. 4 represents my ditching apparatus when used for broad ditches.

Similar letters of reference in each of the several figures indicate corresponding parts.

The nature of my invention consists in a V-shaped follower, made in two halves connected together by adjustable hinges with or without cross-pieces J J, so as to adapt the implement to ditches of different width, in combination with two adjustable friction-rollers, N N.

To enable others skilled in the arts to make and use my invention, I will proceed to describe its construction and operation.

The plow A for cutting the earth consists of curved mold-board, B, of the shape represented in Figs. 1, 2, and 3, and of a straight and steel-faced landside, C, and an oblique runner or support, D, for the mold-board.

F is the plow-beam, to which the team is hitched. At the rear end of the plow-frame, which is braced by a cross-beam, D, is the driver's seat E. The driver, by shifting his position upon said seat, can throw his weight to one or the other side, so as to cause the plow to work at an angle instead of horizontally. It will be understood that the furrow will be the narrower the greater that angle, and thus the operation of the plow can be adapted to the required width of the ditch. Two chains, G, are hung at the forward ends to the cross-beam D of the plow, and at the rear ends to a V-shaped follower, so that the follower will be dragged along behind the plow.

The follower is made in two V-shaped halves, K H K H, the outer face of each half being steel-faced, as seen at L. The lower edge of each steel face is turned up at right angles. The two arms K H of each half are stiffened by a cross-brace, M, and are at their rear ends provided with a double series of holes, Q Q. Brackets O, which serve as bearings for friction and smoothing rollers N, are secured to the arms K H by bolts P P, passed through said holes Q Q. By inserting the bolts higher or lower in the series of holes the brackets, and together with them the rollers, may be adjusted higher or lower, so as to allow the rollers to project more or less beyond the under surface of the follower, and thereby regulate their action upon the soil. The two halves of the follower are connected by hinges I I.

If the improvement is to be used for narrow ditches, the two wings of each hinge are secured, one to each of the arms H, as represented in Fig. 1. These hinges allow the two halves of the follower to assume any desired angle to each other, which angle determines the inclination of the sides of the ditch, while the space in the center, between the two arms H H, determines the width of the base of the ditch. If a ditch of a wider base is to be made, the wings of the hinges attached to one of the arms H are unscrewed and intermediate cross-pieces, J, are inserted between the two halves of the follower, and the arms H H are hinged to the ends of said cross-pieces, as seen in Fig. 4.

As the width of the base of the ditch will always correspond to the distance between the arms H H of the two halves, any desired width can be obtained by inserting intermediate cross-pieces, J, of suitable length.

The two halves of the follower, being hinged in the line of their motion, extend from the bottom completely up the sides of the ditch, and thus discharge at the top the earth which is loosened by the plow at bottom, and form sides of proper inclination and symmetry.

What I claim as my invention, and desire to secure by Letters Patent, is—

The use, in the described connection, with a ditching-plow, of a V-shaped follower made in two halves, K H K H, connected together by adjustable hinges with or without cross-pieces J J, so as to adapt the implement to ditches of different width, in combination with two adjustable friction-rollers, N N, substantially as set forth.

E. C. MARTIN.

Witnesses:
 ROBERT TILLARD,
 JOHN COLEMAN.